(12) United States Patent
Aluvila et al.

(10) Patent No.: US 11,966,756 B2
(45) Date of Patent: Apr. 23, 2024

(54) METHOD FOR SCHEDULING FEATURE SERVICES WITH A DISTRIBUTED DATA FLOW SERVICE FRAMEWORK

(71) Applicant: Aptiv Technologies AG, Schaffhausen (CH)

(72) Inventors: Vinod Aluvila, Hildesheim (DE); Miguel Angel Aguilar, Düsseldorf (DE)

(73) Assignee: Aptiv Technologies AG, Schaffhausen (CH)

( * ) Notice: Subject to any disclaimer, the term of this patent is extended or adjusted under 35 U.S.C. 154(b) by 0 days.

(21) Appl. No.: 17/811,216

(22) Filed: Jul. 7, 2022

(65) Prior Publication Data

US 2023/0020772 A1 Jan. 19, 2023

(30) Foreign Application Priority Data

Jul. 13, 2021 (EP) .................................. 21185445

(51) Int. Cl.
*G06F 9/00* (2006.01)
*G06F 9/24* (2006.01)
(Continued)

(52) U.S. Cl.
CPC ........ *G06F 9/44505* (2013.01); *G06F 9/3885* (2013.01); *G06F 9/54* (2013.01); *G06N 20/00* (2019.01)

(58) Field of Classification Search
None
See application file for complete search history.

(56) References Cited

U.S. PATENT DOCUMENTS

2013/0232495 A1* 9/2013 Rossbach .............. G06F 9/5044
718/102
2015/0269074 A1* 9/2015 Shah ....................... G06F 13/28
711/130

FOREIGN PATENT DOCUMENTS

CN 112448992 3/2021
EP 3506095 7/2019

OTHER PUBLICATIONS

Shi Wenbiad, "Edge computing task scheduling method and device threreof", Mar. 5, 2021.*
(Continued)

*Primary Examiner* — Nitin C Patel
(74) *Attorney, Agent, or Firm* — Harness, Dickey & Pierce, P.L.C.

(57) ABSTRACT

The present disclosure generally relates to dataflow applications. In aspects, a system is disclosed for scheduling execution of feature services within a distributed data flow service (DDFS) framework. Further, the DDFS framework includes a main system-on-chip (SoC), at least one sensing service, and a plurality of feature services. Each of the plurality of feature services include a common pattern with an algorithm for processing the input data, a feature for encapsulating the algorithm into a generic wrapper rendering the algorithm compatible with other algorithms, a feature interface for encapsulating a feature output into a generic interface allowing generic communication with other feature services, and a configuration file including a scheduling policy to execute the feature services. For each of the plurality of feature services, processor(s) schedule the execution of a given feature service using the scheduling policy and execute a given feature service on the standard and/or accelerator cores.

20 Claims, 7 Drawing Sheets

(51) Int. Cl.
*G06F 9/38* (2018.01)
*G06F 9/445* (2018.01)
*G06F 9/54* (2006.01)
*G06N 20/00* (2019.01)

(56) References Cited

OTHER PUBLICATIONS

"Extended European Search Report", EP Application No. 21185445.0, dated Dec. 17, 2021, 11 pages.
"Khronos", Retrieved at: https://www.khronos.org/openvx/—on Jul. 1, 2022, 4 pages.
"OpenCV", Retrieved at: https://opencv.org/—on Jul. 1, 2022, 3 pages.

* cited by examiner

METHOD FOR SCHEDULING FEATURE SERVICES WITH A DISTRIBUTED DATA FLOW SERVICE FRAMEWORK

INCORPORATION BY REFERENCE

This application claims priority to European Patent Application Number 21185445.0, filed Jul. 13, 2021, the disclosure of which is incorporated by reference in its entirety.

BACKGROUND

Various methods and algorithms based on AI/ML, are researched and developed by many companies/consortiums towards this goal. These algorithms need to be carefully chosen and integrated into today's automotive head units to make the best use of those features. Since these algorithms come from different suppliers, which use proprietary algorithms, data structure formats, or Application Programming Interfaces, 'API's, it becomes a challenge to integrate and combine those algorithms into Original Equipment Manufacturer, 'OEM', platforms in a standard way. One common aspect is that these algorithms are data-driven, and they involve heavy processing of input data.

Database such as OpenCV provides a real-time optimized computer vision library, tools, and hardware. It also supports model execution for machine learning and artificial intelligence.

Another database such as OpenVX is an open, royalty-free standard for cross platform acceleration of computer vision applications. It is designed to facilitate portable, optimized and power-efficient processing of methods for vision algorithms.

The existing solutions mentioned are not addressing the problem of combining various algorithm implementations—possibly coming from different suppliers and based on custom algorithm implementations—into a common platform.

Further, related art solutions do not address the use-case of formation of processing pipelines in a distributed system by connecting to AI/ML, algorithms running on remote machines or cores. Furthermore, related art solutions do not provide any flexibility by configuration to 'schedule' the processing rate for optimal hardware usage. Moreover, related art solutions do not work across the boundaries of virtualized (or hypervised) systems.

There is a need for improving existing disclosures in order to at least partially overcome the aforementioned drawbacks.

SUMMARY

The present disclosure generally relates to dataflow applications, and utilizing Artificial Intelligence, 'AI', and Machine Learning, 'ML' technologies with the goal of ensuring safety of people and environment. For example, the disclosure relates to the field of automotive and to a framework for automotive perception systems inside and/or outside of the vehicle, such as autonomous, semi-autonomous or conventional vehicles.

In aspects, the present disclosure discloses a method for scheduling execution of feature services within a distributed data flow service, 'DDFS', framework, the DDFS framework including a main system-on-chip, 'SoC', with a standard core and at least one accelerator core; at least one sensing service providing input data containing sensor data; a plurality of feature services to process the input data, wherein each feature services a common pattern with an algorithm for processing the input data, a feature for encapsulating the algorithm into a generic wrapper rendering the algorithm compatible with other algorithms from other feature services, a feature interface for encapsulating the feature output into a generic interface allowing generic communication with other services and a configuration file including a scheduling policy to execute the feature services; and wherein the method comprises for each feature service: scheduling the execution of the feature service using the scheduling policy of the configuration file; and executing each feature service on the standard core and/or the at least one accelerator core.

With such scheduling method, the framework allows flexible and distributed deployment of features including classical or machine learning based algorithms in any dataflow application domains in a supervised and controlled manner. Further, the DDFS has the capability to configure the services to be executed according to flexible scheduling policies. The services can be configured to run as per the scheduling policy specified in their own configuration file, i.e., every service can follow its own independent scheduling policy.

According to an aspect, each feature service receives input data in the form of input frames and for each feature service to be executed, the scheduling policy is a self-regulated scheduling policy selected amongst one of the following: (i) a free run execution whenever an input frame is available, the input frame is processed; (ii) a time triggered execution with fixed frame rate wherein at a given interval of time one input frame is processed; (iii) a time triggered execution with batch wherein at a given interval of time, queued input frames are processed in batch; (iv) a frame triggered execution with batch whenever a given amount of input frames are queued, queued input frames are processed in batch; and (v) a time triggered execution with a fixed timebox wherein within the fixed timebox queued input frames are processed. These self-regulated scheduling policies to execute the services achieve a good trade-off between processing performance and latency. The scheduling policies of the different services are statically chosen during design time to meet the framework performance requirements of a given platform (SoC) and feature service set.

According to an aspect, a chain of at least two feature services from the plurality of feature services forms a service pipeline wherein the first feature service in the chain receives input data from the at least one sensing service and wherein output of each feature service in the service pipeline is used as input for the next feature service of the chain except for the last feature service. Beneficially, the DDFS supports multiple sequential and independent service pipelines. Furthermore, independent service pipelines share same input data and wherein multiple service pipelines share the same output. Thanks to the common pattern (as shown in FIG. 2) for feature services, each feature service is modeled as standalone execution units with standard input and output interfaces, which allow feature services to be connected in a chain to form a pipeline.

According to an aspect, at least one feature service contains an artificial intelligence/machine learning, 'AI/ML', algorithm, said feature service with a AI/ML algorithm being processed by the at least one accelerator core. AI/ML algorithms which need more resources are preferably processed on any of the accelerator cores while other services without AI/ML algorithms can be executed on the standard core, providing an optimized use of the available resources.

According to an aspect, the DDFS framework further includes a core controller/scheduler to control the execution of the feature services and/or their execution rate and/or a runtime ML controller for managing access to AI/ML resources by the feature services. The proposed framework ensures that the ever-increasing sets of algorithms/features can be efficiently executed by distributing and orchestrating services within limited hardware resources and strict requirements.

According to an aspect, the DDFS framework includes a plurality of sensing services in a vehicle among which in-cabin sensors and/or external sensors including at least one camera and/or at least one other sensor device.

According to an aspect, the DDFS framework supports communication with distributed feature services including executing features services on the main SoC running either a host Operating System, 'OS', or a guest OS and/or on at least one external SoC running either a host OS or a guest OS.

According to an aspect, each feature service further includes a control interface to connect with the DDFS to start or stop the feature service and/or an input processing queue to queue input frames either from the at least one sensing service or from another feature service.

According to an aspect, the input processing queue is configured in one of the following manners: (i) queue all where all input frames are queued for processing; (ii) queue latest where only the last received input frame is hold; (iii) queue latest N where the last N received input frames are hold; and (iv) skip input frames where only one every N'th received input frame is hold. The framework supports various queuing strategies which allows for achieving flexible processing rates to make best use of the allocated resources.

According to an aspect, the configuration file further includes: (i) feature and algorithm specific parameters; (ii) input processing rate; (iii) target core for AI/ML algorithm execution on any of the at least one accelerator core; (iv) service inter-connections corresponding to a different implementation of the feature service; and/or (v) inter-process communication, 'IPC', wherein the DDFS framework supports flexible selection of IPC technologies.

According to an aspect, the configuration file of a feature service is amendable without recompilation. This approach to configure the feature service allows an easy and flexible way to change the behavior of the service.

The present disclosure also relates to a non-transitory computer-readable medium comprising program instructions for causing a processor to execute the method according to any aspect presented above.

The present disclosure also relates to a motor vehicle comprising a non-transitory computer-readable medium as indicated above.

Other aspects will be disclosed hereafter in the detailed description.

BRIEF DESCRIPTION OF THE DRAWINGS

The disclosure and the embodiments suggested in the present disclosure should be taken as non-limitative examples and will be better understood with reference to the attached Figures in which.

DETAILED DESCRIPTION

The present disclosure is about a framework which allows for flexible and distributed deployment of features including classical or machine learning based algorithms in any data-flow application domains in a supervised and controlled manner. Further, the proposed framework ensures that the ever-increasing sets of algorithms/features can be efficiently executed by distributing and orchestrating services within limited hardware resources and strict requirements.

Figure 1:
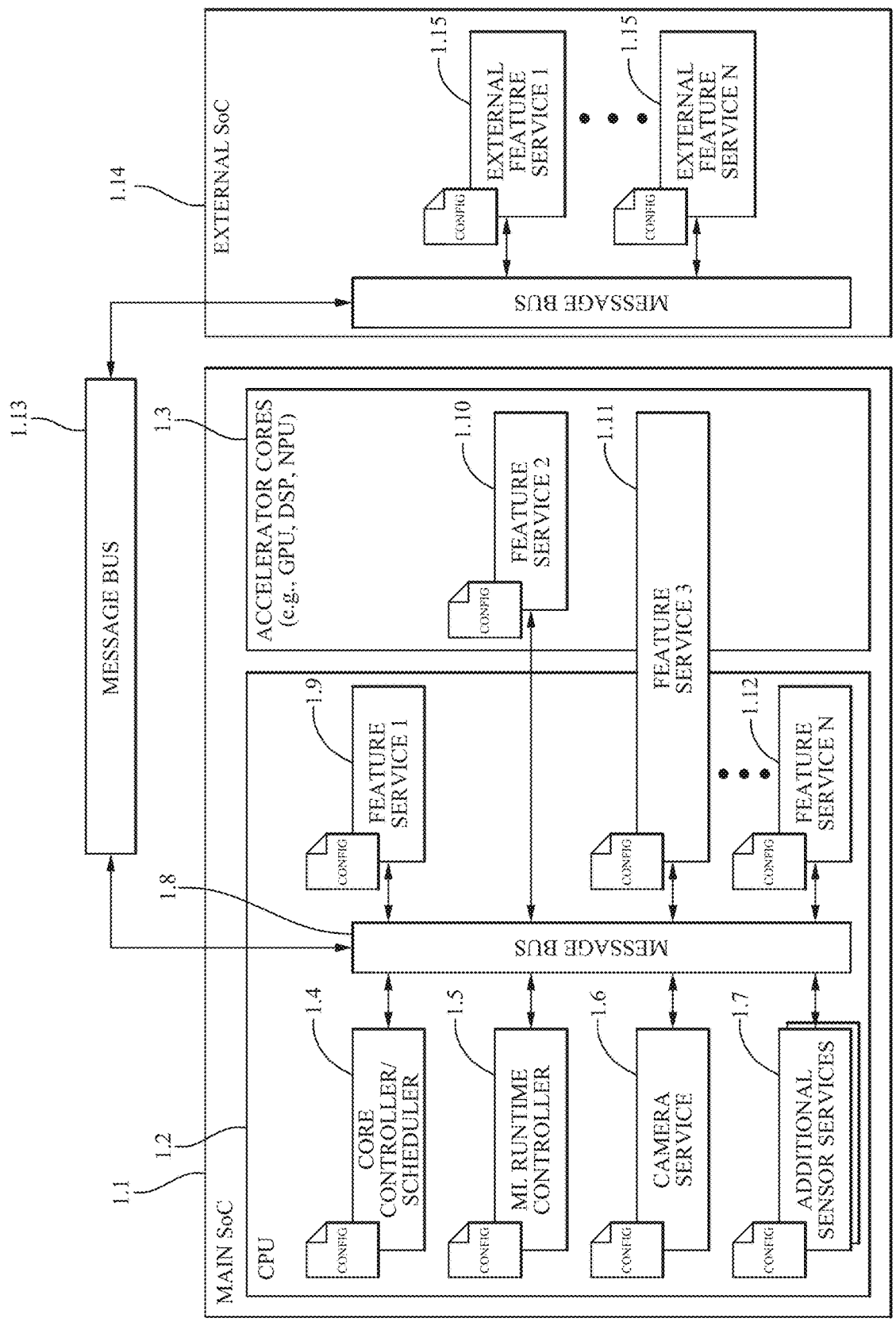
FIG. 1 provides a schematic overview of a Distributed Data-Flow Service (DDFS) framework.

FIG. 1 shows an overview of the proposed Distributed Data-Flow Service, 'DDFS', framework according to an aspect of the disclosure. The various components of DDFS are designed as Services. The DDFS is preferably designed as a Service oriented Architecture, 'SOA', which allows to use independent locations for rendering the services such as on different cores with a high reusability and scalability of the services as well as parallel processing.

The DDFS framework has a main System on a Chip, 'SoC' (1.1) and may include one or several external SoC (1.14). The main SoC has a standard core a.k.a. a main Central Processing Unit, 'CPU' (1.2) and at least one or more so-called accelerator cores (1.3) also called hardware accelerators such as a Graphical Processing Unit, 'GPU', a Digital Signal Processor, 'DSP', or a Neural Processing Unit, 'NPU', etc.

The DDFS framework has a core controller/scheduler (1.4) that orchestrates the execution of the Services. The controller/scheduler allows to control the execution rate of the Services. For managing the access to the AI/ML resources by the Services there is a ML Runtime Controller (1.5). The communication between Services is done via a high-speed message bus (1.8). Services can be divided in two main types, the sensing services providing input data to the DDFS and feature services processing these data.

The DDFS supports sensing services such as a camera service (1.6) and/or additional sensor services (1.7). For automotive perception systems, sensing services are connected to in-cabin sensors (also known as in-cabin sensing or cabin monitoring) and/or exterior sensors of the vehicle. The input source data is provided by the sensing services such the camera service (1.6) for images or any other type of sensor (1.7) for other kind of data. Then, the sensing services can be dynamically started and stopped at any time needed, which makes the framework highly flexible.

The DDFS also supports one or several feature services on the main SoC (1.1) which can run either fully on the CPU (1.2), e.g., like the represented feature services 1 and N (1.9; 1.12), or fully on any of the accelerator cores (1.3), e.g., like the represented feature service 2 (1.10), or partially on both the CPU and one or more accelerator cores, e.g., like the represented feature service 3 (1.11). In particular for feature services including an AI/ML algorithm, pre- and post-processing algorithms may run on the CPU, while the AI/ML part of the algorithm run on one (or more) of the accelerator cores as they are better designed to process these AI/ML-type algorithms.

From the DDFS perspective there is no maximum limit on the number of Services supported either sensing services or feature services. A limit is given by the target platform and the DDFS is aware of these resources such that it can efficiently manage these resources.

The DDFS also supports communication via a message bus (1.13) with distributed Services (1.15) running on one or more external SoCs (1.14), which makes the DDFS a highly scalable solution.

Figure 9:
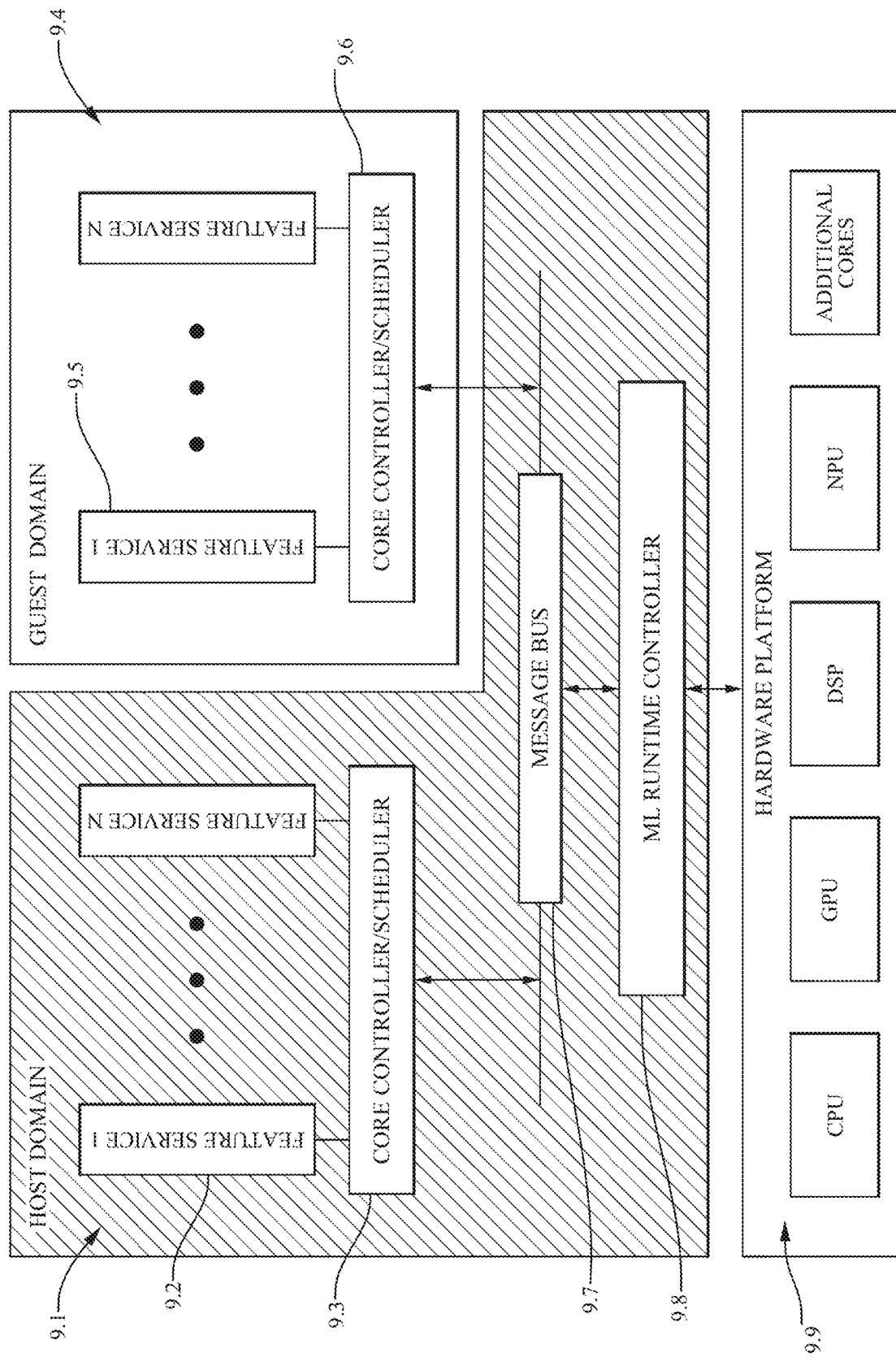
FIG. 9 shows another example of the structure of a DDFS service architecture.

The DDFS also enables Services running in a virtualized environment to access the underlying, e.g., AI/ML, resources, since the DDFS can be executed on the host operating system, 'OS', while the Services are executed within a guest OS (see FIG. 9).

DDFS Service Pattern: Design and Usage

Figure 2:
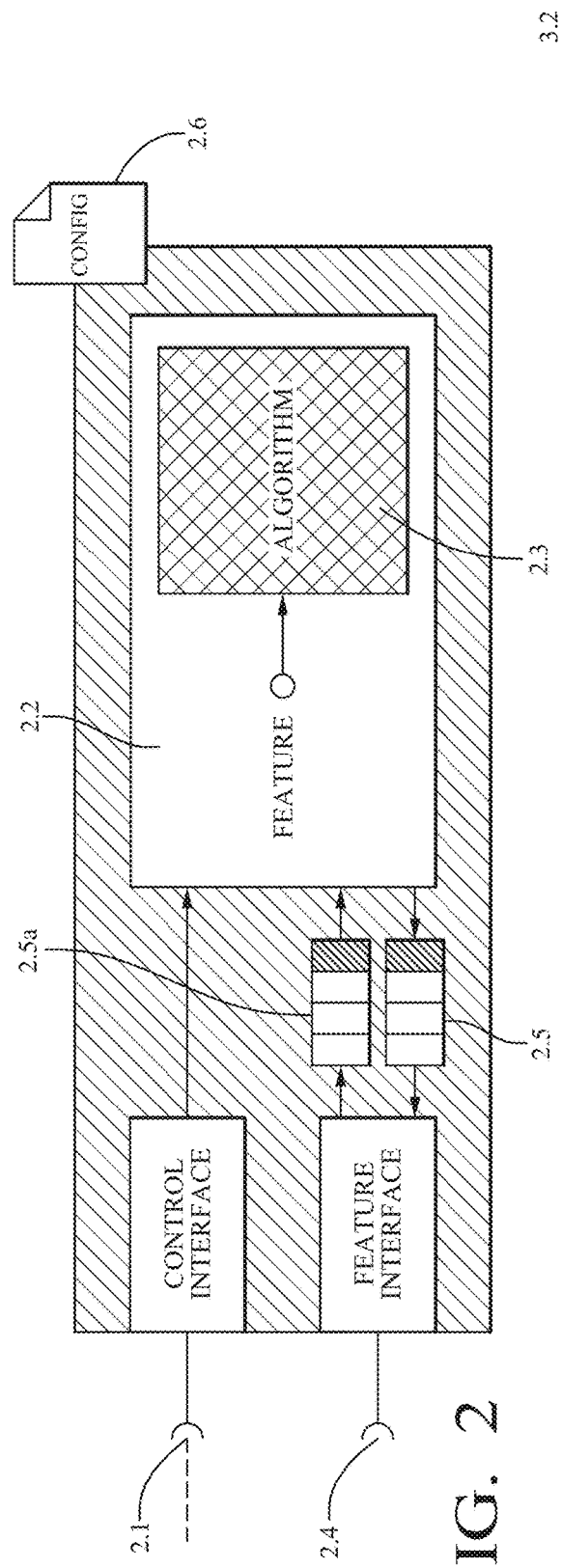
FIG. 2 shows an example of the structure of a feature service.

FIG. 2 shows the structure of a feature service, which is composed of six main parts: a control interface (2.1), a wrapper feature (2.2), one or more algorithms (2.3), a feature interface (2.4), input and output processing queues (2.5a; 2.5b) and a configuration file (2.6). Each feature service is designed to provide one or more features. These features either provide a final output or an intermediate output serving as input to another feature service, which further process these results and produces new outputs.

The control interface (2.1) acts as a connection to the DDFS. This part implements and supports a control interface defined by the DDFS. By means of this control interface, the framework is be able to manage the Service, e.g., start or stop the Service.

The wrapper feature (2.2) encapsulates the underlying algorithm(s) (or software development kits), 'SDK', which provide(s) the feature(s) of the Service (or parts of them). Since algorithm suppliers are not bound to a standardized API approach, the feature component of the feature service acts as a generic wrapper to give a streamlined view to outside of the Service. In this way, the core controller/scheduler (1.4) part is unaware of the internal details of the supplier APIs.

The algorithm (2.3) is the data processing algorithm (e.g., face detection, drowsiness, among others) that can be based either on classical or machine learning (AI/ML) methods. As seen with respect to FIG. 1, the DDFS framework may have multiple target accelerator cores, e.g., GPU, DSP and NPU, to execute the AI/ML models of the algorithm. The feature service can be configured to choose any of the target accelerator core (1.3). In case, none of the accelerator cores is available, the feature service can be executed on the standard core (CPU).

The feature interface (2.4) encapsulates the output of the algorithm (2.3) into a generic interface, which is independent of the underlying supplier API. This allows a generic communication with other feature services and the DDFS more generally. In addition, with such structure, the internal feature (both the wrapper feature and the algorithm) can be modified, without changing their feature interface and thereby not affecting other feature services in the framework depending on this interface.

The input processing queue (2.5a) is used as a buffer for the input data flow into the Service. The input data flow of the system is independent of the processing rate of the Service. Therefore, each of the Service is designed to have an own queue of inputs, which gets filled while the Service is busy processing an input. The framework supports various queuing strategies which allows for achieving flexible processing rates to make best use of the allocated resources. Similarly, an optional output processing queue (2.5b) is used as a buffer for the output data flow out of the Service. More particularly, when a feature service is either executed alone or as the last feature service in a pipeline then the output processing queue can be skipped by configuration.

The configuration file (2.6) specifies parameters that define how the Service should operate. The Service configuration can be modified without the need of Service recompilation. This approach to configure the Service allows an easy and flexible way to change the behavior of the Service. The following items are configurable aspects of Services: a.) Feature and algorithm specific parameters; b.) Input processing rate; c.) Scheduling policy; d.) Target accelerator core (e.g., GPU, DSP, NPU) for the execution of AI/ML algorithm; e.) Service inter-connections corresponding to a different implementation of the same feature (basically another Service with the matching interface) can be introduced by changing the configuration; and f.) Inter-process communication for supporting flexible selection of IPC technologies by the framework supports.

DDFS Service Pipelines

In the DDFS framework, at least one sensing service and several feature services have the possibility to form pipelines by feeding the output of one feature service as input to the following feature service. The sensing service provides input data to the first feature service in the chain forming the pipeline.

Figure 3:
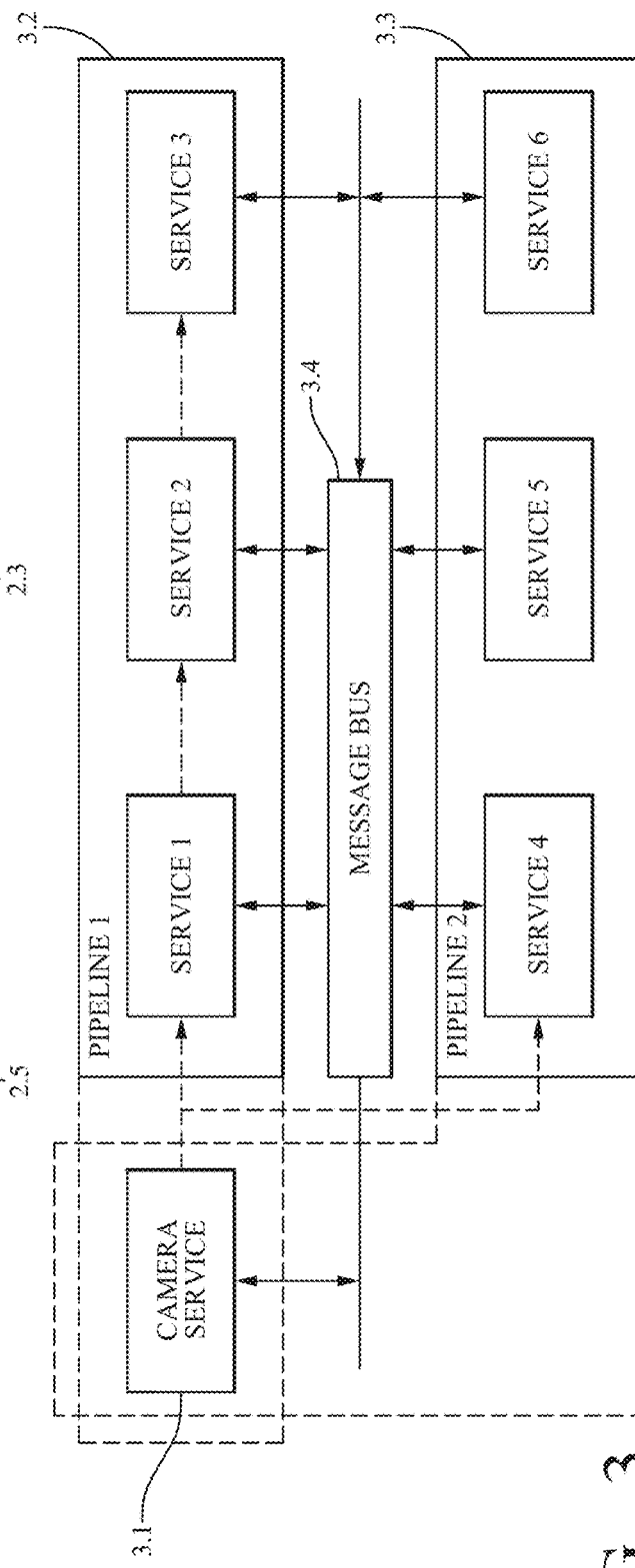
FIG. 3 is an example of DDFS service pipelines.

FIG. 3 shows an example of two parallel pipelines (3.2 and 3.3). Each pipeline receives input data flow from one or several sensing services. In the represented example, each pipeline (3.2; 3.3) includes one sensing device, namely the camera service (3.1) providing as an input image frames, and subsequently formed by a chain or sequence of 3 feature services (Services 1-3; Services 4-6). The communication between asynchronous services is performed via messages in the fast communication bus (3.4) by inter-connecting those feature services to the bus which supports multiclient communication (i.e., output of one feature service as input to multiple other feature services).

Pipelines allow to form complex features, such as in-cabin sensing (e.g., drowsiness detection) by combining selected sensing devices and specific feature services. DDFS defines a common pattern (as shown in FIG. 2) for feature services such that each feature service is modeled as stand-alone execution units with standard input and output interfaces, which allow feature services to be connected in a chain to form a pipeline.

Pipeline use-cases considered in DDFS may be one of the following: support of multiple sequential and parallel pipelines; independent pipelines can share the same input (join input); same output can be shared to multiple pipelines (fork output); dynamic insertion/removal of Services from pipelines, without restart; configurability of the execution/processing rate of the pipeline through the configuration of the (sensing and feature) Services forming the pipeline.

DDFS Service Scheduling

DDFS has the capability to configure the Services to be executed according to flexible scheduling policies. The DDFS Services can be configured to run as per the scheduling policy specified in their own configuration file, i.e., every Service can follow its own independent scheduling policy. Different scheduling policies are supported by the Services. A first category of scheduling policy is the self-regulated scheduling of Services. A second category of scheduling policy is the framework regulated scheduling of Services.

One scheduling policy of the first category is the so-called free-run policy where the Services can be made to run freely, so that as and when the necessary inputs are available, it can start processing the input immediately. This is the simplest (and default) case where the only influencing factor is the scheduling policy of the underlying OS (either host, guest or distributed).

Figure 4:
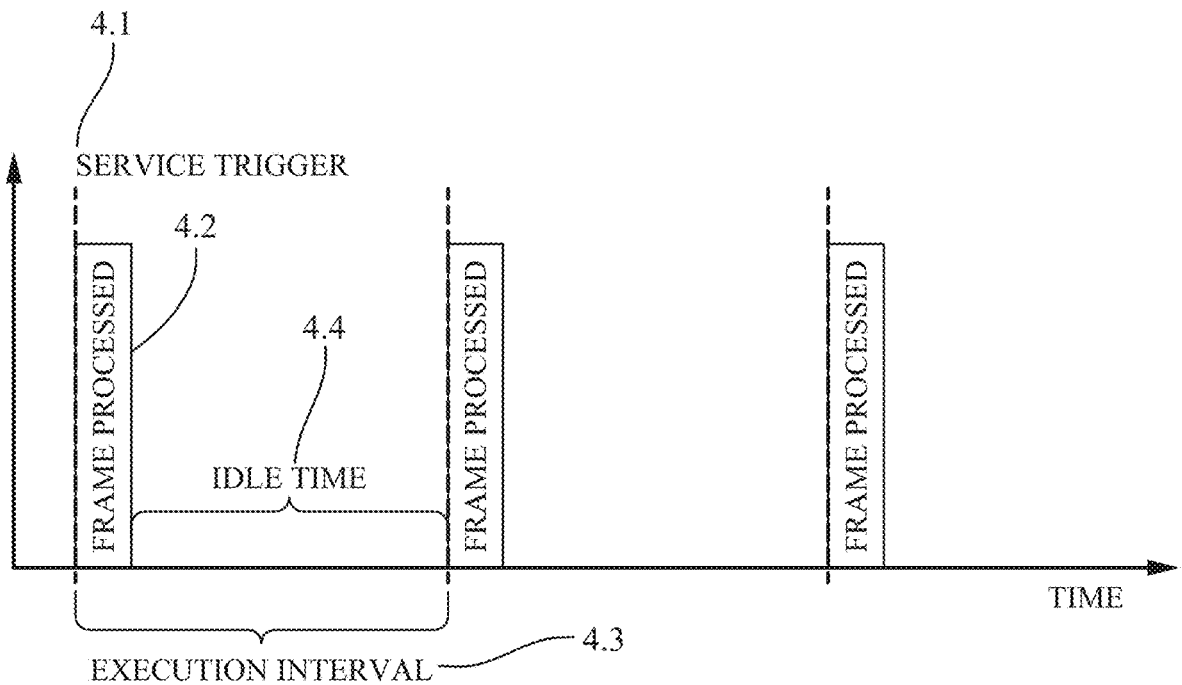
FIG. 4 shows an example with a fixed frame rate policy scheduling.

Another scheduling policy of the first category is time triggered with fixed frame rate. With such policy, Services are triggered at a given interval of time (period or execution interval) and they process a single input frame. FIG. 4 shows an example of the fixed frame rate policy. Once the Service is triggered (4.1), it processes a single input frame (4.2). After processing the input frame, the Service remains idle (4.4) until the Service is triggered again. The Service is triggered again at fixed execution interval (4.3), which is defined by the target frame rate provided in the Service configuration file.

Figure 5:
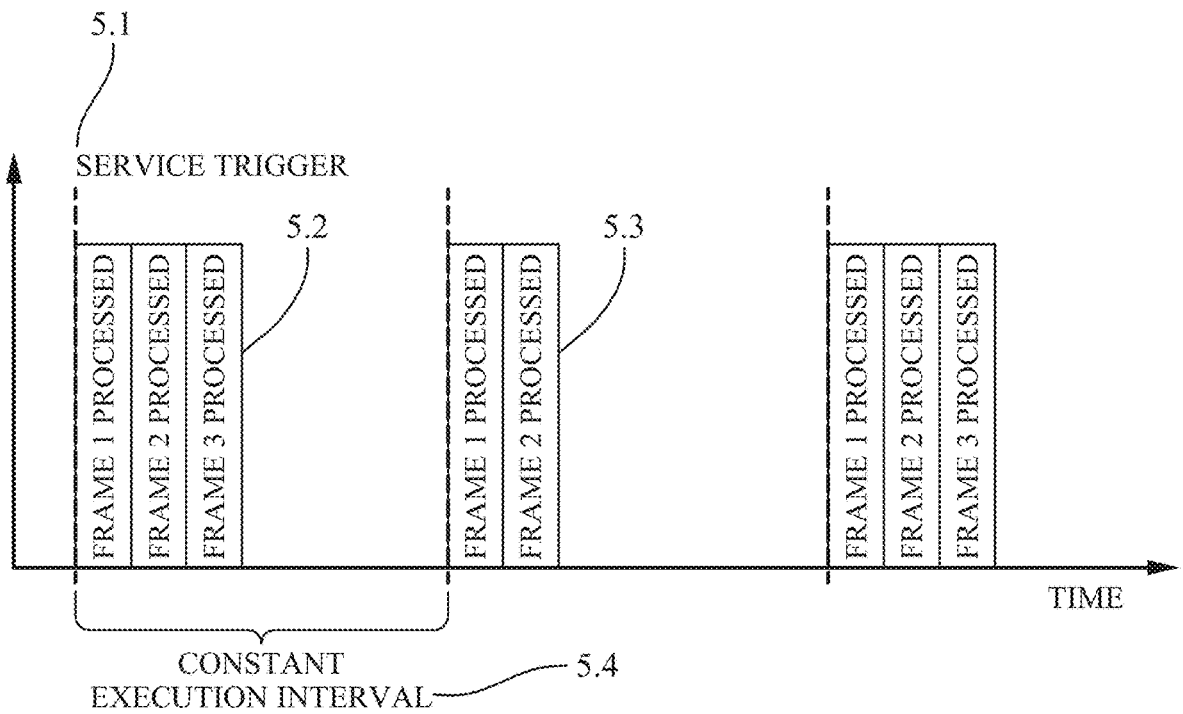
FIG. 5 shows an example with a time triggered batch scheduling.

Another scheduling policy of the first category is time triggered with batch. This scheduling policy is a generalization of the fixed frame rate policy since it allows to execute a given number of frames once the Service has been triggered. FIG. 5 shows an example of this policy. In this example, every time the Service is triggered (5.1), a fixed number of frames, e.g., three, (5.2) from the queue are processed. However, if less frames are available only those available frames are processed (5.3), so there is no guarantee that the given number of frames will be processed every time the Service is executed. In this policy the execution interval is constant (5.4) irrespective of the number of processed frames.

Another scheduling policy of the first category is frame triggered with batch. In this policy, Services are triggered when a given amount of input frames are ready to be processed in the queue. FIG. 5 shows an example of the batch processing. In the represented example, the Service is triggered (6.1), when there are three frames (6.2) in the input processing queue which are ready to be processed. Once the frames are processed, the Service stays idle (6.4) until the new batch of input frames (three in the represented example) is available. In this policy a fixed number of frames to be processed is guaranteed every time the Service is triggered. However, the execution interval (6.3) may be variable depending on the availability of inputs frames.

Figure 6:
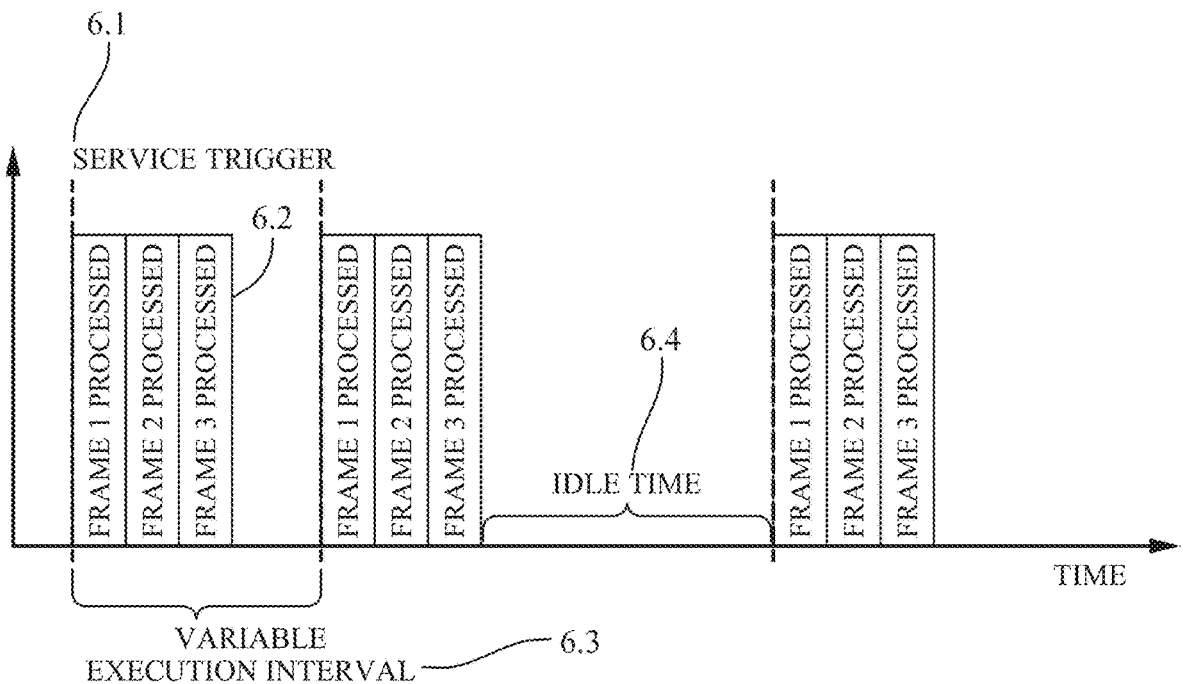
FIG. 6 shows an example with a frame triggered batch scheduling.
Figure 7:
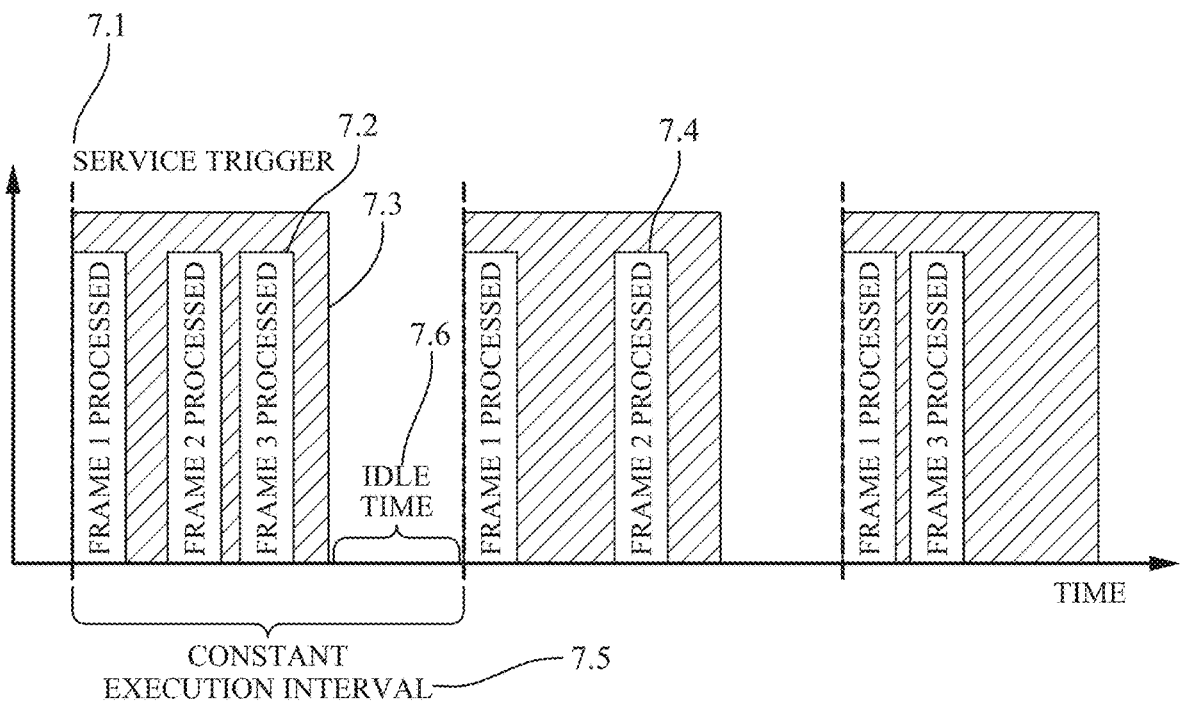
FIG. 7 shows an example with a timebox scheduling.

Another scheduling policy of the first category is time triggered with a timebox. In this policy, Services can run for a given period, called timebox, at regular intervals. In each timebox, Services can process one or multiple input frames until the timebox (or window) expires. Therefore, there is no guarantee that a given number of frames will be processed. FIG. 6 shows an example of timebox scheduling. Every time the Service is triggered (7.1), a timebox (time window) starts (7.3). In the represented example, two (7.2) and three (7.4) frames are processed within the timeboxes. The execution interval of the timeboxes is constant (7.5) but does not necessarily correspond to the timebox. Once the timebox is over, the Service will stay idle (7.6) until the Service is triggered again. If the execution internal is the same as the timebox, then there is no idle time.

The previously explained self-regulated scheduling policies (first category) to trigger Services themselves is generally enough to achieve a good trade-off between processing performance and latency. In this case, the scheduling policies of the different Services are statically chosen during design time to meet the performance requirements of a given sensing and feature service set. Nevertheless, for more dynamic scenarios, framework regulated scheduling of services (second category) is possible through the core scheduler (1.4) that can manage the complete execution of the Services. This core scheduler is responsible to make sure that all Services achieve the specified frame rates.

Figure 8A:
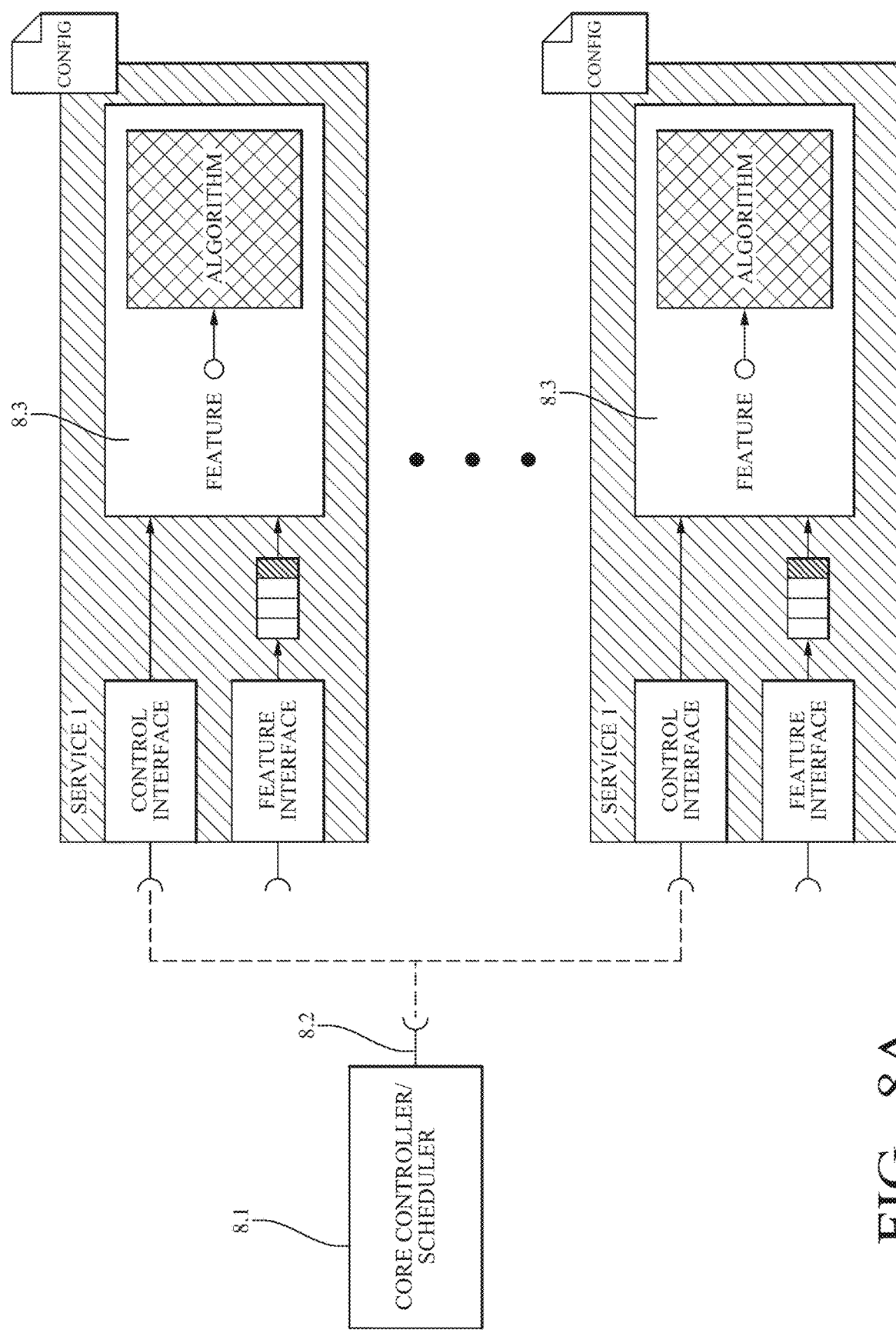
FIGS. 8A and 8B show an example of the interaction of the DDFS core controller and the services.
Figure 8B:
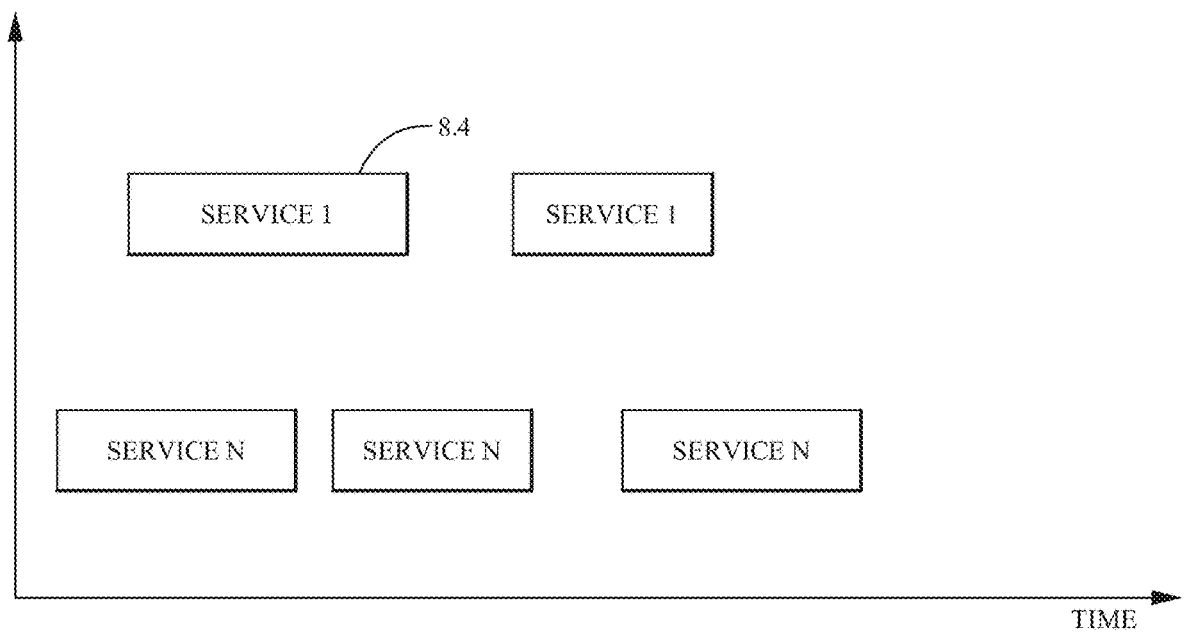

FIGS. 8A and 8B show an example of the interaction of the DDFS core controller/scheduler (8.1) and the Services (8.3). The core controller/scheduler can directly control the execution of the Services via the control interface (8.2). The control interface (8.2) allows the framework to start, stop even change the configuration of each Service. The framework via the core controller/scheduler can decide the frequency and how long Services are active (8.4).

DDFS Queue Configurations

The input (or output) processing queue of each of the Services can be independently configured. In a configuration, so-called "Queue All", the queue is used in a default mode where all inputs will be queued for processing. In case the queue would be full before the Service has been executed and the queued frames cleared, the queue is managed as a FIFO (First-in/First-Out). In another configuration, so-called "Queue Latest", the queue is guaranteed to hold the latest input only. When a new input frame is received, the older one is discarded. In another configuration, so-called "Queue Latest N", which is an extension the "Queue Latest" mode, the queue is guaranteed to hold a fixed number of latest inputs only. When new input frames are received, older ones are discarded. Another configuration, so-called "Skip Inputs", one or more inputs are ignored and not added to the queue at all, which results in queuing every N'th input only.

FIG. 9 shows another example of the structure of a DDFS service architecture in a virtualized (hypervised) environment. The virtualized environment has a host domain (9.1), one or more guest domains (9.4) and a hardware platform (9.9). The framework enables Services running in a virtualized environment to access the underlying, e.g., AI/ML, resources, since the DDFS can be executed on the host operating system, 'OS', while the Services are executed within a guest OS.

The host domain (9.2) includes some feature services 1 . . . N (9.2) to be executed on the host OS, a core controller/scheduler (9.3), a message bus (9.7) and a ML runtime controller (9.8) connecting the Services to the hardware platform (9.9).

The guest domain (9.4) also includes some feature services 1 . . . N (9.5) to be executed on the guest OS, and its core controller/scheduler (9.6) connected to the ML runtime controller (9.8) via the message bus (9.7).

The hardware platform (9.9) includes the standard core (e.g., CPU) and one or more accelerators cores (e.g., GPU, DSP, NPU, etc.).

The different embodiments of the disclosure offer several key benefits among which: the flexibility to scale and adapt to various platforms of different capabilities just by changing the Service configuration; the high Service configurability in terms of frame rates, queue sizes, processing cores, IPC, etc.; enablement of distributed deployment of Services within the framework; easy set-up of processing chains/pipelines from distributed Services; easy integration to Hardware in Loop/Software in Loop, 'HIL/SIL' tests; dynamic plug-n-play style replacement/introduction/removal of Services in a pipeline; easy and encapsulated high-level integration of algorithms from multiple suppliers within the DDFS; high re-usability by encapsulating the internal details of algorithms from external system; high portability of Services across operating systems and hardware platforms; high scalability as the framework supports simple standalone Services up to processing chains involving several Services (limited only by the underlying hardware and software platform capabilities); enablement of Services running inside guest Operating Systems in a virtualized (hypervised) environment to access the underlying hardware efficiently.

The present disclosure also relates to a non-transitory computer-readable medium comprising program instructions for causing a processor to execute the method for scheduling execution of feature services within a DDFS framework according to any of its embodiments or according to any possible combination of its embodiments.

The term "non-transitory" does not exclude legitimate tangible temporary storage media such as flash drives or any rewritable storage media. Generally speaking, a computer-accessible medium may include any tangible or non-transitory storage media or memory media such as electronic, magnetic, or optical media. Such a media may be a disk, a CD/DVD-ROM or any other medium which may be coupled to the DDFS framework via a dedicated communication interface or one of the already disclosed interfaces. Alternatively, such a media may be located within the DDFS framework, e.g., in a permanent manner.

The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM) and flash memory. Program instructions and data stored on a tangible computer-accessible storage medium in non-transitory form may further be transmitted by transmission media or signals such as electrical, electromagnetic or digital signals.

The present disclosure further relates to a motor vehicle comprising a non-transitory computer-readable medium executing the method for scheduling execution of feature services within the DDFS framework. More specifically, the disclosure relates to a framework for automotive perception systems (e.g., for interior sensors also known as in-cabin sensing or cabin monitoring and/or for exterior sensors of the vehicle).

Although an overview of the inventive subject matter has been described with reference to specific example embodiments, various modifications and changes may be made to these embodiments without departing from the broader spirit and scope of embodiments of the disclosure disclosed in the present description.

What is claimed is:

1. A method for scheduling execution of a plurality of feature services within a distributed data flow service (DDFS) framework, the DDFS framework comprising:
a main system-on-chip (SoC) with a standard core and at least one accelerator core;
a sensing service providing input data containing sensor data;
the plurality of feature services, the plurality of feature services configured to process the input data, each of the plurality of feature services comprise:
a common pattern with an algorithm for processing the input data;
a feature for encapsulating the algorithm into a generic wrapper rendering the algorithm compatible with other algorithms from other feature services;
a feature interface for encapsulating a feature output into a generic interface allowing generic communication with other feature services; and
a configuration file, the configuration file comprising a scheduling policy to execute the feature services, and wherein the method comprises:
scheduling, for each of the plurality of feature services, an execution of a given feature service using the scheduling policy of the configuration file; and
executing, for each of the plurality of feature services, the given feature service on at least one of the standard core or the at least one accelerator core.

2. The method according to claim 1,
wherein each of the plurality of feature services receive input data in a form of input frames; and
wherein, for each feature service to be executed, the scheduling policy is selected amongst one of the following:
a free run execution whenever an input frame is available, the input frame is processed;
a time triggered execution with fixed frame rate wherein at a given interval of time one input frame is processed;
a time triggered execution with batch wherein at a given interval of time, queued input frames are processed in batch;
a frame triggered execution with batch whenever a given amount of input frames are queued, queued input frames are processed in batch; and
a time triggered execution with a fixed timebox wherein within a fixed timebox queued input frames are processed.

3. The method according to claim 1,
wherein a chain of at least one sensing service and at least two feature services from the plurality of feature services forms a service pipeline;
wherein a first feature service in the chain receives input data from the at least one sensing service; and
wherein output of each feature service in the service pipeline is used as input for the next feature service of the chain except for the last feature service.

4. The method according to claim 3, wherein the DDFS supports multiple sequential and independent service pipelines.

5. The method according to claim 4,
wherein independent service pipelines share same input data; and
wherein multiple service pipelines share the same output.

6. The method according to claim 1, wherein at least one feature service contains an artificial intelligence/machine learning (AI/ML) algorithm, the at least one feature service with an AI/ML algorithm being processed by the at least one accelerator core.

7. The method according to claim 1, wherein the DDFS framework further comprises at least one of:
a core controller/scheduler to control at least one of the execution of the feature services or their execution rate; or
a runtime ML controller for managing access to AI/ML resources by the feature services.

8. The method according to claim 1, wherein the DDFS framework comprises a plurality of sensing services in a vehicle, the plurality of sensing services comprising at least one of:
- in-cabin sensors; or
- external sensors including one or more cameras.

9. The method according to claim 1, wherein the DDFS framework supports communication with distributed feature services in a virtualized environment, the support sufficient to enable execution of feature services using underlying resources of a hardware platform, the hardware platform comprising one or more of:
- the main SoC running at least one of a host operating system (OS) or a guest OS; and
- at least one external SoC running at least one of the host OS or the guest OS.

10. The method according to claim 1, wherein each of the plurality of feature services further comprise:
- a control interface to connect with the DDFS so as to start or stop a given feature service; and
- an input processing queue to queue input frames from one or more of the sensing service or from another feature service.

11. The method according to claim 10, wherein the input processing queue is configured to:
- queue all where all input frames are queued for processing;
- queue latest where only the last received input frame is hold;
- queue latest N where the last N received input frames are hold; and
- skip input frames where only one every N'th received input frame is hold.

12. The method according to claim 1, wherein the configuration file further comprises at least one of:
- feature and algorithm specific parameters;
- input processing rate;
- target standard and/or accelerator cores for AI/ML algorithm execution;
- service inter-connections corresponding to a different implementation of the feature service; or
- inter-process communication (IPC) wherein the DDFS framework supports flexible selection of IPC mechanisms.

13. The method according to claim 1, wherein the configuration file of a feature service is amendable without recompilation.

14. A system for scheduling execution of feature services within a distributed data flow service (DDFS) framework, the DDFS framework comprising:
- a main system-on-chip (SoC) with a standard core and at least one accelerator core;
- a sensing service providing input data containing sensor data;
- a plurality of feature services to process the input data, wherein each of the plurality of feature services comprise:
  - a common pattern with an algorithm for processing the input data;
  - a feature for encapsulating the algorithm into a generic wrapper rendering the algorithm compatible with other algorithms from other feature services;
  - a feature interface for encapsulating a feature output into a generic interface allowing generic communication with other feature services; and
  - a configuration file, the configuration file comprising a scheduling policy to execute the feature services; and
- a non-transitory computer-readable medium storing one or more programs comprising instructions, which when executed by a processor, cause the processor to perform operations including:
  - scheduling, for each of the plurality of feature services, an execution of a given feature service using the scheduling policy of the configuration file; and
  - executing, for each of the plurality of feature services, the given feature service on at least one of the standard core or the at least one accelerator core.

15. The system according to claim 14,
wherein each of the plurality of feature services receive input data in a form of input frames; and
wherein, for each feature service to be executed, the scheduling policy is selected amongst one of the following:
- a free run execution whenever an input frame is available, the input frame is processed;
- a time triggered execution with fixed frame rate wherein at a given interval of time one input frame is processed;
- a time triggered execution with batch wherein at a given interval of time, queued input frames are processed in batch;
- a frame triggered execution with batch whenever a given amount of input frames are queued, queued input frames are processed in batch; and
- a time triggered execution with a fixed timebox wherein within a fixed timebox queued input frames are processed.

16. The system according to claim 14,
wherein a chain of at least one sensing service and at least two feature services from the plurality of feature services forms a service pipeline;
wherein a first feature service in the chain receives input data from the at least one sensing service; and
wherein output of each feature service in the service pipeline is used as input for the next feature service of the chain except for the last feature service.

17. The system according to claim 16, wherein the DDFS supports multiple sequential and independent service pipelines.

18. The system according to claim 17,
wherein independent service pipelines share same input data; and
wherein multiple service pipelines share the same output.

19. The system according to claim 14, wherein at least one feature service contains an artificial intelligence/machine learning (AI/ML) algorithm, the at least one feature service with an AI/ML algorithm being processed by the at least one accelerator core.

20. The system according to claim 14, wherein the configuration file of a feature service is amendable without recompilation.

* * * * *

UNITED STATES PATENT AND TRADEMARK OFFICE
CERTIFICATE OF CORRECTION

PATENT NO. : 11,966,756 B2  
APPLICATION NO. : 17/811216  
DATED : April 23, 2024  
INVENTOR(S) : Vinod Aluvila et al.

Page 1 of 1

It is certified that error appears in the above-identified patent and that said Letters Patent is hereby corrected as shown below:

On the Title Page

Column 2, Other Publications, Line 2: Delete "threreof" ," and insert --thereof",--

Signed and Sealed this  
Eighth Day of April, 2025

Coke Morgan Stewart  
*Acting Director of the United States Patent and Trademark Office*